(12) United States Patent
Wada et al.

(10) Patent No.: US 12,578,241 B2
(45) Date of Patent: Mar. 17, 2026

(54) STRAIN SENSOR FOR DETECTING MOVEMENT OF MEASUREMENT TARGET

(71) Applicant: YAMAHA CORPORATION, Hamamatsu (JP)

(72) Inventors: Yohei Wada, Hamamatsu (JP); Yasuro Okumiya, Shuchigun Morimachi (JP); Koji Yataka, Hamamatsu (JP); Katsunori Suzuki, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 423 days.

(21) Appl. No.: 18/156,589

(22) Filed: Jan. 19, 2023

(65) Prior Publication Data

US 2023/0152169 A1    May 18, 2023

Related U.S. Application Data

(63) Continuation of application No. PCT/JP2021/023375, filed on Jun. 21, 2021.

(30) Foreign Application Priority Data

Jul. 21, 2020    (JP) ................................ 2020-124741

(51) Int. Cl.
*G01L 1/22* (2006.01)
*G01B 7/16* (2006.01)

(52) U.S. Cl.
CPC .............. *G01L 1/2231* (2013.01); *G01B 7/18* (2013.01); *G01L 1/2287* (2013.01)

(58) Field of Classification Search
None
See application file for complete search history.

(56) References Cited

U.S. PATENT DOCUMENTS 9,459,167 B2 * 10/2016 Heinkel ................ G01L 3/1457
2012/0118070 A1 * 5/2012 Mol ..................... G01G 3/1412
73/760

(Continued)

FOREIGN PATENT DOCUMENTS

CN      109073353 A    12/2018
JP      2001074574 A    3/2001

(Continued)

OTHER PUBLICATIONS

WO2020013046 translation (Year: 2020).*

(Continued)

*Primary Examiner* — Eric S. McCall
*Assistant Examiner* — Nigel H Plumb
(74) *Attorney, Agent, or Firm* — ROSSI, KIMMS & McDOWELL LLP

(57) ABSTRACT

A strain sensor for detecting movement of a measurement target according to one example includes: a fixed member having a frame which is ring-shaped; and a first strain sensor element and a second strain sensor element, each of the first strain sensor element and the second strain sensor element being string-shaped or strip-shaped, and the first and second strain sensor elements being stretchable and recoverable in a lengthwise direction of the first strain sensor element and a lengthwise direction of the second strain sensor element. The first and second strain sensor elements extend across the frame and are disposed such that the first and second strain sensor elements cross each other, and the frame is configured to be deformable at least in the lengthwise direction of the first strain sensor element and the lengthwise direction of the second strain sensor element.

18 Claims, 7 Drawing Sheets

(56)          References Cited

U.S. PATENT DOCUMENTS

2019/0094004 A1    3/2019    Okumiya et al.
2020/0141825 A1    5/2020    Obata

FOREIGN PATENT DOCUMENTS

WO           2019031381 A1     2/2019
WO       WO-2020013046 A1 *   1/2020    .............. F16C 19/52

OTHER PUBLICATIONS

International Search Report issued in Intl. Appln. No. PCT/JP2021/023375 mailed Sep. 7, 2021. English translation provided.
Written Opinion issued in Intl. Appln. No. PCT/JP2021/023375 mailed Sep. 7, 2021.
Office Action issued in Chinese Appln. No. 202180059896.9 mailed Aug. 2, 2025.
Office Action issued in Chinese Appln. No. 202180059896.9, mailed Dec. 7, 2025. English machine translation provided.

* cited by examiner

STRAIN SENSOR FOR DETECTING MOVEMENT OF MEASUREMENT TARGET

CROSS-REFERENCE TO RELATED APPLICATIONS

This application is a continuation application of International Application No. PCT/JP2021/023375, filed on Jun. 21, 2021, which claims priority to Japanese Patent Application No. 2020-124741 filed in Japan on Jul. 21, 2020. The entire disclosures of International Application No. PCT/JP2021/023375 and Japanese Patent Application No. 2020-124741 are hereby incorporated herein by reference.

BACKGROUND

Technical Field

The present disclosure relates to a sensor, particularly a biometric sensor.

Background Information

Various efforts have been undertaken to detect movement of measurement targets such as people and/or animals and convert the movement into numerical data.

A strain sensor which employs a strain sensor element having a resistance value that can vary in accordance with stretching and recovering is well-known as a device for detecting the movement of such measurement targets (see, for example, PCT Publication No. 2019/031381). Adopting the strain sensor element to detect the movement enables configuring the sensor to be noninvasive and superior in terms of wearing sensation.

SUMMARY

The strain sensor element is string-shaped or strip-shaped, and is capable of detecting the movement of the measurement target in accordance with a change in the resistance value resulting from the stretching and/or recovering in a lengthwise direction of the strain sensor element. In a case in which this strain sensor element is attached to the measurement target at an equilibrium length, when the measurement target moves in a direction so as to elongate the strain sensor element (hereinafter, may be also referred to as merely "elongating direction"), the resistance value varies in accordance with the elongation of the strain sensor element, whereby the movement of the measurement target can be detected. In contrast, when the measurement target moves in a direction so as to shorten the strain sensor element (hereinafter, may be also referred to as merely "shortening direction"), since the strain sensor element is attached at the equilibrium length, the strain sensor merely induces slack, and the strain sensor element does not shorten. In other words, since no change in the resistance value is generated in the strain sensor, the movement of the measurement target cannot be detected.

In the case of the conventional strain sensor, tension is applied to the strain sensor element beforehand (pretension) to enable detecting the movement of the measurement target, even if the measurement target moves in the shortening direction. In other words, the strain sensor element is attached to the measurement target in a state of being elongated to a predetermined length. In this case, since the strain sensor element shortens in a direction involving returning to the equilibrium length when the measurement target moves in the shortening direction, a change in the resistance value is generated in the strain sensor element. Thus, the movement of the measurement target can be detected.

If the pretension is insufficient, the strain sensor element slackens, whereby the movement in the shortening direction cannot be detected. On the other hand, if the pretension is excessive, an error can occur when the measurement target moves in the elongating direction, due to, e.g., deviation from a measurable range on a measurement circuit side, whereby the measurement may fail. Thus, since it is necessary to apply the pretension appropriately, putting on the strain sensor element requires labor.

The present disclosure was made in view of the foregoing circumstances, and an object of the present disclosure is to provide a biometric sensor which is noninvasive, superior in terms of wearing sensation, and can be put on easily, and enables detecting the movement of a measurement target even in the shortening direction.

The biometric sensor according to one aspect of the present disclosure includes: a fixed member having a frame which is ring-shaped; and a first strain sensor element and a second strain sensor element, each of the first strain sensor element and the second strain sensor element being string-shaped or strip-shaped, and the first strain sensor element and the second strain sensor element being stretchable and recoverable in a lengthwise direction of the first strain sensor element and a lengthwise direction of the second strain sensor element, wherein the first strain sensor element and the second strain sensor element extend across the frame and are disposed such that the first strain sensor element and the second strain sensor element cross each other, and wherein the frame is configured to be deformable at least in the lengthwise direction of the first strain sensor element and the lengthwise direction of the second strain sensor element.

DESCRIPTION OF EMBODIMENTS

Figure 1:
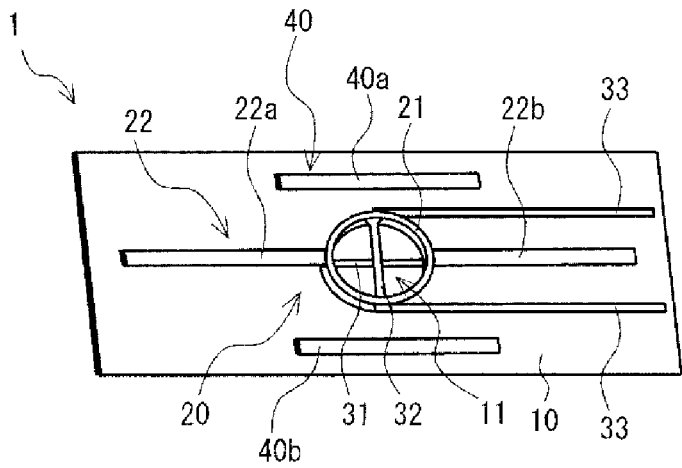
FIG. 1 is a schematic perspective view illustrating a biometric sensor according to one embodiment of the present disclosure.

The biometric sensor according to one embodiment of the present disclosure includes: a fixed member having a frame which is ring-shaped; and a first strain sensor element and a second strain sensor element, each of the first strain sensor element and the second strain sensor element being string-shaped or strip-shaped, and the first strain sensor element and the second strain sensor element being stretchable and recoverable in a lengthwise direction of the first strain sensor element and a lengthwise direction of the second strain sensor element, wherein the first strain sensor element and the second strain sensor element extend across the frame and are disposed such that the first strain sensor element and the second strain sensor element cross each other, and wherein the frame is configured to be deformable at least in the lengthwise direction of the first strain sensor element and the lengthwise direction of the second strain sensor element.

The biometric sensor according to the one embodiment of the present disclosure is noninvasive and superior in terms of the wearing sensation due to being able to be used by being affixed onto a surface of the measurement target, e.g., a human body. Furthermore, in a case in which the measurement target moves in the elongating direction of the first strain sensor element, the biometric sensor can detect the movement of the measurement target by means of the first strain sensor element. On the other hand, in a case in which the measurement target moves in the shortening direction of the first strain sensor element, since the second strain sensor element, which crosses the first strain sensor element, elongates due to a deformation of the frame, the movement of the measurement target can be detected by means of the second strain sensor element. In other words, in addition to the movement of the measurement target in the elongating direction of the first strain sensor element, the biometric sensor can also detect the movement in the shortening direction thereof. Furthermore, since, at a time of putting on the biometric sensor, it is not necessary to apply pretension, the biometric sensor can be put on easily.

The first strain sensor element and the second strain sensor element preferably cross each other orthogonally.

A crossing position where the first strain sensor element and the second strain sensor element cross each other preferably corresponds to a central position of the frame.

The frame is preferably circular ring-shaped or polygonal ring-shaped.

The fixed member preferably has a first reinforcing part and a second reinforcing part, each of the first reinforcing part and the second reinforcing part being rod-shaped or plate-shaped, and the first reinforcing part and the second reinforcing part extending in mutually opposite directions outwards from outer edges of the frame and along the lengthwise direction of the first strain sensor element.

The biometric sensor preferably includes: a substrate being strip-shaped, which is flexible and secures the fixed member; and a first holding part and a second holding part, each of the first holding part and the second holding part being rod-shaped or plate-shaped, and the first holding part and the second holding part extending, on a top face of the substrate, in the lengthwise direction of the first strain sensor element, wherein the first holding part and the second holding part are disposed along the lengthwise direction of the first strain sensor element and on outer sides of the frame such that the frame is disposed between the first holding part and the second holding part.

Hereinafter, embodiments of the present disclosure will be described in detail with reference to the drawing or drawings as appropriate.

Figure 2:
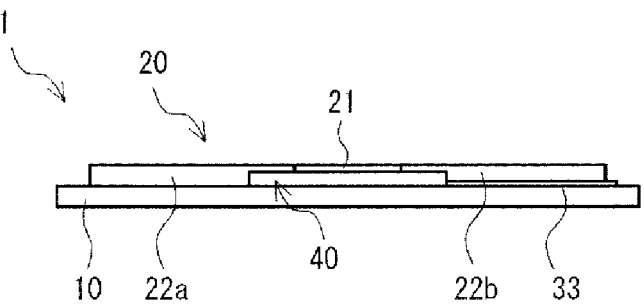
FIG. 2 is a schematic lateral view of the biometric sensor illustrated in FIG. 1.

The biometric sensor 1 illustrated in FIG. 1 and FIG. 2 includes: a substrate 10; a fixed member 20; a first strain sensor element 31 and a second strain sensor element 32; and holding parts 40. Since all of these components can be made thin, the biometric sensor 1 as a whole can also be made thin. Hereinafter, the present disclosure is described taking the biometric sensor as an example, but the present disclosure can also be used as a sensor which detects movements other than those of organisms.

The fixed member 20 has a frame 21 which is ring-shaped, wherein the first strain sensor element 31 and the second strain sensor element 32 extend across the frame 21 and are disposed such that the first strain sensor element 31 and the second strain sensor element 32 cross each other. Furthermore, the substrate 10 secures the fixed member 20. The biometric sensor 1 is suitably used as a device for measuring behaviors of a human body such as respiration.

Substrate

The substrate 10 is strip-shaped and flexible.

The substrate 10 is preferably a substrate which is flexible in such a way that the elongation and shortening of the fixed member 20 are not impeded, and is exemplified by a knitted fabric, a woven fabric, a nonwoven fabric, a rubber, leather, or the like. Of these, the knitted fabric, which is superior in terms of a property of being stretchable and recoverable, is suitably used.

In the biometric sensor 1, as illustrated in FIG. 2, the fixed member 20, the holding part 40, and the wiring 33, described later, are secured on a top face of one strip of the substrate 10. It is to be noted that in FIG. 2, a configuration in which the fixed member 20 is secured on the one strip of the substrate 10 is illustrated, but a configuration in which one further substrate 10 is laminated on a top face side of this substrate 10 to secure the fixed member 20 by sandwiching between the two strips of the substrate 10 is preferred. Thus sandwiching the fixed member 20 between the two strips of the substrate 10 can improve the wearing sensation.

The substrate 10 is preferably carved out along the frame 21 of the fixed member 20, described later. In other words, the substrate 10 preferably has a hole 11 which overlaps with the frame 21 of the fixed member 20 in a planar view. When the hole 11 is thus provided in the substrate 10, there is an absence of hindrance to the movement of the fixed member 20 in an inner side of the ring of the fixed member 20. Thus, concentration of the movement of the measurement target to the first strain sensor element 31 and the second strain sensor element 32 is facilitated, whereby sensitivity of the biometric sensor 1 can be increased.

A size of the substrate 10 is appropriately decided based on, e.g., a size of the fixed member 20 and the like, and can be, for example, 5 cm or more and 15 cm or less in a lengthwise direction, and 2 cm or more and 5 cm or less in a crosswise direction. A size of the biometric sensor 1 in the planar view is decided based on the size of the substrate 10, and can thus be made to be comparatively small.

It is to be noted that a tacky layer may be provided on a bottom face (a face on which the fixed member 20 and the like are not provided) of the substrate 10. When the tacky layer is thus provided on the bottom face of the substrate 10, for example, the substrate 10 can be easily affixed to and peeled off of the measurement target.

Fixed Member

As illustrated in FIG. 1, the fixed member 20 has, in addition to the frame 21, two reinforcing parts 22 (a first reinforcing part 22a and a second reinforcing part 22b) each being rod-shaped or plate-shaped, which extend in mutually opposite directions outwards from outer edges of the frame 21 along the lengthwise direction of the first strain sensor element 31. As described above, the fixed member 20 is secured to the substrate 10. A method for securing the fixed member 20 is not particularly limited, and for example, a method involving adhering to the substrate 10, an entire face of the fixed member 20 which comes in contact with the substrate 10 can be exemplified.

Frame

The frame 21 is configured to be deformable at least in the lengthwise direction of the first strain sensor element 31 and the lengthwise direction of the second strain sensor element 32. In the biometric sensor 1 illustrated in FIG. 1, the frame 21 is circular ring-shaped, and the frame 21 is deformable in an arbitrary direction. Due to the frame 21 thus being deformable in the arbitrary direction, for example, even if the movement of the measurement target does not run along the lengthwise direction of the first strain sensor element 31 or the second strain sensor element 32, the movement can be detected more easily. However, it is not necessary for the frame 21 to be deformed in a direction other than the lengthwise direction of the first strain sensor element 31 and the lengthwise direction of the second strain sensor element 32.

A material and a ring thickness (width and diameter) of the frame 21 are decided such that the frame 21 has deformable elastic force in response to the movement of the measurement target. For example, a urethane rubber having a width of 0.5 mm or more and 1 mm or less, a spring wire having a diameter of 0.1 mm or more and 1.0 mm or less, or the like can be adopted. Examples of the spring wire include a hard steel wire, a piano wire, a stainless steel wire, phosphor bronze for a spring, and the like. It is to be noted that the thickness of the ring of the frame 21 is preferably uniform. When the thickness of the ring of the frame 21 is uniform, the first strain sensor element 31 and the second strain sensor element 32 can be elongated in proportion to the movement of the measurement target, thereby increasing the measurement accuracy.

The size of the frame 21 (an outer diameter, as of the frame 21 being circular ring-shaped in the biometric sensor 1 illustrated in FIG. 1) is appropriately decided in accordance with the sensitivity and the like of the first strain sensor element 31 and the second strain sensor element 32 which extends across the frame 21, and can be, for example, 1 cm or more and 3 cm or less.

Reinforcing Parts

The reinforcing parts 22 accurately grasp the movement of the measurement target in the lengthwise direction of the first strain sensor element 31, and are members for guiding the deformation of the frame 21. For example, in a case in which the measurement target is a human body and the movement thereof results from respiration, the movement of a surface of the human body due to the respiration is not uniform. If, by providing the reinforcing parts 22, the movement of the surface of the human body can be grasped at any of the sites where the reinforcing parts 22 are located, the movement can be transmitted to the frame 21.

A first reinforcing part 22a and a second reinforcing part 22b, being two reinforcing parts 22, are provided symmetrically with the frame 21 being interposed therebetween. By enhancing the symmetry with respect to the lengthwise direction of the first strain sensor element 31, the deformation of the frame 21 due to the movement of the measurement target can be prevented from becoming uneven, thereby increasing the measurement accuracy. Furthermore, in light of the measurement accuracy, the first reinforcing part 22a and the second reinforcing part 22b are preferably disposed so as to align with the first strain sensor element 31 in a straight line.

As a material of the reinforcing parts 22, the same material as that of the frame 21 can be used.

A width and length of the reinforcing parts 22 are appropriately optimized in accordance with the measurement target. When the width and length of the reinforcing parts 22 are too short, the movement of the measurement target may not be accurately grasped. Conversely, when the width and length of the reinforcing parts 22 are too long, displacing the reinforcing parts 22 in accordance with the movement of the measurement target may become more difficult, leading to a decrease in the amount of deformation of the frame 21, whereby measurement sensitivity may decrease.

It is to be noted that in light of the measurement sensitivity, the reinforcing parts 22 are preferably disposed to be parallel to the lengthwise direction of the first strain sensor element 31, but this does not exclude disposing the reinforcing parts 22 at an angle with respect to the lengthwise direction of the first strain sensor element 31. Even if the reinforcing parts 22 are disposed at an angle with respect to the lengthwise direction of the first strain sensor element 31, the biometric sensor 1 achieves similar effects. It is to be noted that the angle formed between each of the reinforcing parts 22 and the lengthwise direction of the first strain sensor element 31 is, for example, 30° or less, and the angle being smaller is more preferable.

Strain Sensor

The first strain sensor element 31 and the second strain sensor element 32 (hereinafter, may be also collectively referred to as "strain sensor element") are each a string-shaped or strip-shaped component which is stretchable and recoverable in a lengthwise direction thereof. The strain sensor element can directly detect the movement of the measurement target. For example, in the case of measuring the respiration of a human body, since changes in a state of the respiration can be grasped in real time, taking control of data indicative of various diseases based on respiration, such as respiratory failure, is enabled without delay.

The strain sensor element is acceptable as long as it has the property of being stretchable and recoverable, and the electrical characteristics thereof vary in accordance with elongation and shortening. A strain resistance element in which the electrical resistance varies in accordance with the elongation and shortening is suitably used. In particular, a carbon nanotube (hereinafter, may be also referred to as "CNT") strain sensor which employs CNT(s) is particularly suitably used.

In the case in which the strain sensor element is string-shaped, the strain sensor element can be constituted to include a CNT bundle. The CNT bundle is a fiber bundle in which a plurality of the CNTs (single fibers) are roughly orientated in the lengthwise direction of a CNT element, and is coated with a resin. The string-shaped strain sensor element has, from a center to an outer side in a radial direction: an electrically conductive part consisting of the CNT bundle; an electrically conductive layer being a composite of CNT fibers and the resin; and a coating film made of the resin, in this order. The strain sensor element can undergo a change in resistance by rupture of the CNT bundle in the center, followed by alteration of gaps generated by the rupture.

On the other hand, in the case in which the strain sensor element is strip-shaped, the strain sensor element can be constituted from a resin composition containing a plurality of CNT fibers. Specifically, the strip-shaped strain sensor element has: a sheet of a plurality of fiber bundles obtained by orientating a plurality of CNTs (single fibers) roughly in the lengthwise direction of the CNT element; and a resin which coats the sheet of these fiber bundles. In a case in which an extension strain is applied, the strain sensor element undergoes a change in the resistance value by, for example, breaking of the internal CNT fibers causing splitting of the CNTs at ends, and/or relaxation of the extension strain resulting in contact of the ends of the CNTs again.

As the CNT(s), either of a monolayer single-wall nanotube (SWNT) and a multilayer multi-wall nanotube (MWNT) can be used. Of these, in view of, e.g., the electrical conductivity and thermal capacity, the MWNT is preferred, and the MWNT having a diameter of 1.5 nm or more and 100 nm or less is more preferred.

The CNTs may be produced by a well-known method, and may be produced by, for example, a CVD method, an arc method, a laser ablation method, a DIPS method, a CoMo-CAT method, or the like. Of these, in light of enabling efficiently obtaining a CNT (MWNT) having a desired size, the CNTs are preferably produced by the CVD method involving adopting iron as a catalyst, and using ethylene gas. In this case, CNT crystals of the desired length grown with a vertical orientation can be obtained after forming a thin film of iron or nickel serving as the catalyst on a quartz glass substrate or a silicon substrate with an oxide film attached.

Both ends of each of the first strain sensor element 31 and the second strain sensor element 32 are connected to a measuring part (not shown in the figure) which measures the change in resistance via the wiring 33. It is to be noted that the wiring 33 is connected to enable independently measuring the change in resistance of each of the first strain sensor element 31 and the second strain sensor element 32.

It is preferred that the first strain sensor element 31 and the second strain sensor element 32 cross each other orthogonally, that is to say, that the lengthwise direction of the first strain sensor element 31 and the lengthwise direction of the second strain sensor element 32 cross each other orthogonally. Even if the lengthwise direction of the first strain sensor element 31 and the lengthwise direction of the second strain sensor element 32 do not cross each other orthogonally, the biometric sensor 1 achieves similar effects; however, when these cross each other orthogonally, particularly the measurement sensitivity in the direction in which the first strain sensor element 31 shortens can be increased.

Figure 3:
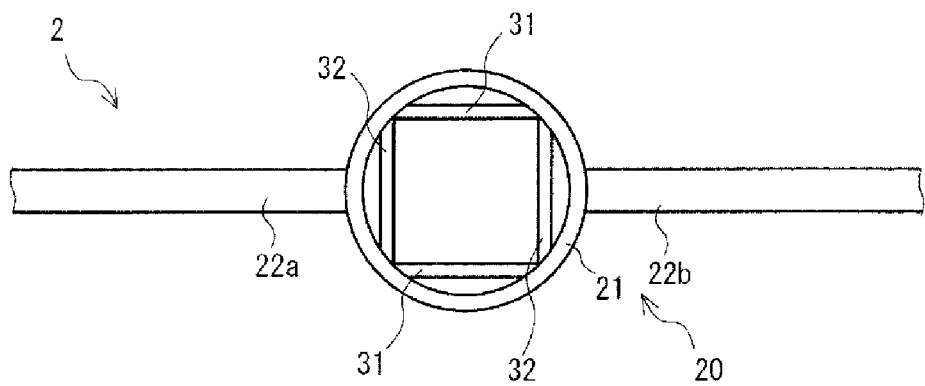
FIG. 3 is a partially enlarged schematic plan view illustrating a frame area of a biometric sensor according to an embodiment which differs from that of FIG. 1.

On the other hand, it is not necessary for the lengthwise direction of the first strain sensor element 31 and the lengthwise direction of the second strain sensor element 32 to cross each other. A biometric sensor 2 illustrated in FIG. 3 shows a configuration in the case in which the lengthwise direction of the first strain sensor element 31 and the lengthwise direction of the second strain sensor element 32 do not cross each other. In this case, the configuration is such that an extension line of the lengthwise direction of the first strain sensor element 31 and an extension line of the lengthwise direction of the second strain sensor element 32 cross each other. It is to be noted that the biometric sensor 2 illustrated in FIG. 3 is provided with two sets of the first strain sensor element 31 and the second strain sensor element 32. It is also possible to adopt a configuration in which the biometric sensor 2 is thus provided with a plurality of sets of the first strain sensor element 31 and the second strain sensor element 32.

As the crossing position where the first strain sensor element 31 and the second strain sensor element 32 cross each other, an arbitrary site within the frame 21 can be adopted, and in particular, a central position of the frame 21 is preferred. More specifically, in the case of the frame 21 being circular ring-shaped, the crossing position where the first strain sensor element 31 and the second strain sensor element 32 cross each other preferably corresponds to the center of the circle. When the crossing position thus corresponds to the central position of the frame 21, the measurement sensitivity can be increased. It is to be noted that the first strain sensor element 31 and the second strain sensor element 32 are not joined at the crossing position. In other words, the first strain sensor element 31 and the second strain sensor element 32 are arranged so as to act independently.

Holding Parts

The holding parts 40 consist of two members, being a first holding part 40a and a second holding part 40b. Each of the two holding parts 40 (the first holding part 40a and the second holding part 40b) is rod-shaped or plate-shaped, and extends, on the top face of the substrate 10, in the lengthwise direction of the first strain sensor element 31. The two holding parts 40 are disposed so as to be perpendicular to the lengthwise direction of the second strain sensor element 32 and on outer sides of the frame 21, with the frame 21 being interposed therebetween.

The holding parts 40 prevent a phenomenon in which the movement of the measurement target is not sufficiently transmitted to the frame 21 because the substrate 10 moves in the lengthwise direction of the first strain sensor element 31 and bends, for example, when the measurement target moves.

As a material of the holding parts 40, the same material as that of the frame 21 can be used. Furthermore, a width and length of the holding parts 40 and a distance from the frame 21 are appropriately decided such that the movement of the measurement target is effectively transmitted to the frame 21.

Principles of Operation

The biometric sensor 1 is capable of detecting the movement of the measurement target with respect to the elongating direction and the shortening direction of the first strain sensor element 31 without applying the pretension to the first strain sensor element 31 and the second strain sensor element 32. Hereinafter, the principles of operation of the biometric sensor 1 are explained with reference to FIG. 4 to FIG. 6.

Figure 4:
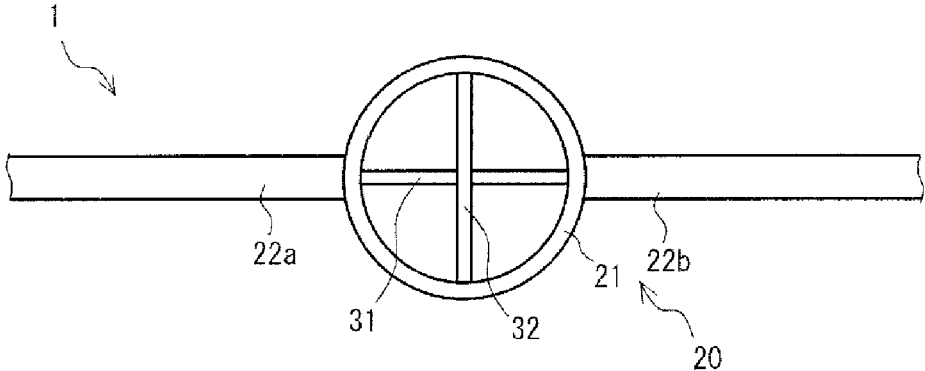
FIG. 4 is a partially enlarged schematic plan view illustrating a frame area of the biometric sensor illustrated in FIG. 1 in a case in which a measurement target does not move.

FIG. 4 is a drawing illustrating the area of the frame 21 of the biometric sensor 1 in a case in which the measurement target does not move. In the case in which the measurement target does not move, due to maintaining the original shape, the frame 21 is circular ring-shaped.

Figure 5:
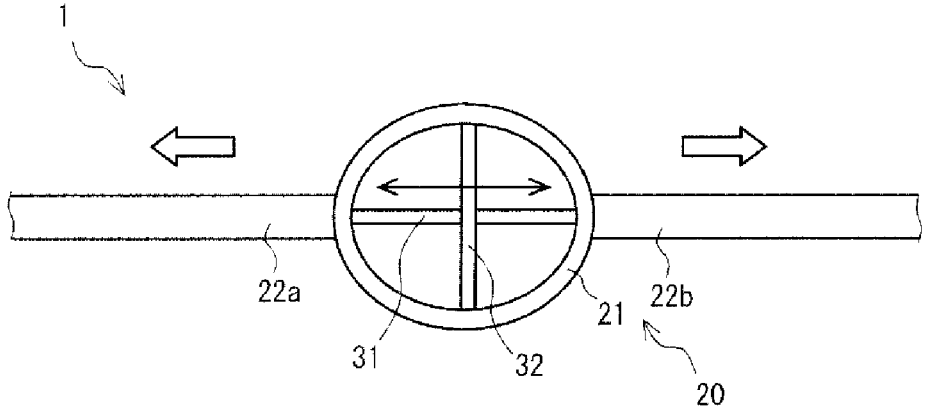
FIG. 5 is a partially enlarged schematic plan view illustrating the frame area of the biometric sensor illustrated in FIG. 1 in a case in which the measurement target moves in an elongating direction of a first strain sensor element.

A case in which the measurement target moves in the elongating direction of the first strain sensor element 31 is illustrated in FIG. 5. When the measurement target moves in the elongating direction of the first strain sensor element 31, the frame 21 deforms to be elliptical ring-shaped, having a major axis in the lengthwise direction of the first strain sensor element 31. In this case, since the first strain sensor element 31 is pulled and elongated, a change in resistance is generated in the first strain sensor element 31. On the other hand, since the pretension has not been applied, slack is generated in the second strain sensor element 32 due to the deformation of the frame 21, whereby the resistance does not change. Accordingly, in the case in which the measurement target moves in the elongating direction of the first strain sensor element 31, the movement can be detected based on the change in resistance of the first strain sensor element 31.

Figure 6:
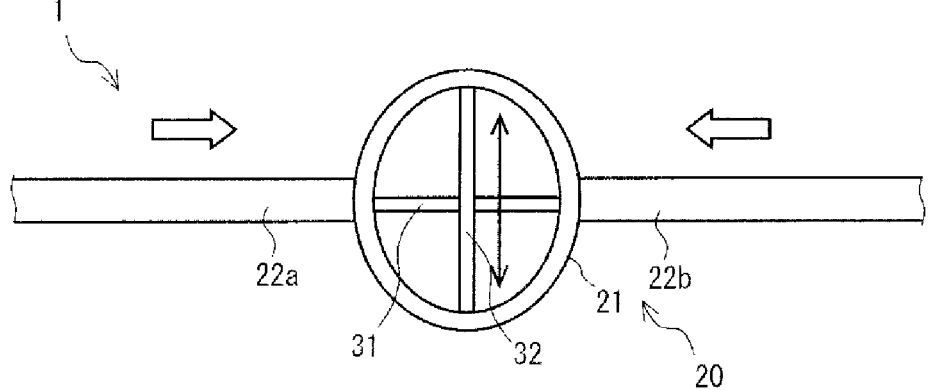
FIG. 6 is a partially enlarged schematic plan view illustrating the frame area of the biometric sensor illustrated in FIG. 1 in a case in which the measurement target moves in a shortening direction of the first strain sensor element.

In contrast, a case in which the measurement target moves in the shortening direction of the first strain sensor element 31 is illustrated in FIG. 6. When the measurement target moves in the shortening direction of the first strain sensor element 31, the frame 21 deforms to be elliptical ring-shaped, having a major axis in the lengthwise direction of the second strain sensor element 32. In this case, since the pretension has not been applied, slack is generated in the first strain sensor element 31 due to the deformation of the frame 21, whereby the resistance does not change. Conversely, since the second strain sensor element 32 is pulled and elongated, a change in resistance is generated in the second strain sensor element 32. Accordingly, in the case in which the measurement target moves in the shortening direction of the first strain sensor element 31, the movement can be detected based on the change in resistance of the second strain sensor element 32.

Thus, in the case of the biometric sensor 1, whether the measurement target moves in the elongating direction or the shortening direction of the first strain sensor element 31, the movement can be detected by the change in resistance of the first strain sensor element 31 or the change in resistance of the second strain sensor element 32.

It is to be noted that in the above description, the case in which the pretension has not been applied to the first strain sensor element 31 and the second strain sensor element 32 is described; however, the biometric sensor 1 functions similarly even if the pretension is applied. Thus, applying the pretension to the first strain sensor element 31 and the second strain sensor element 32 is not to be excluded. However, it is preferred that the pretension is not applied in such a manner that the frame 21 is deformed.

The biometric sensor 1 can be affixed on the surface of the measurement target, e.g., a human body, for use; thus, the biometric sensor 1 is noninvasive and superior in terms of the wearing sensation. Furthermore, in the case in which the measurement target moves in the elongating direction of the first strain sensor element 31, the biometric sensor 1 can detect the movement of the measurement target by means of the first strain sensor element 31. On the other hand, in the case in which the measurement target moves in the shortening direction of the first strain sensor element 31, due to the elongation of the second strain sensor element 32, which crosses the first strain sensor element 31 due to the deformation of the frame 21, the movement of the measurement target can be detected by the second strain sensor element 32. In other words, in addition to the movement of the measurement target in the elongating direction of the first strain sensor element 31, the biometric sensor 1 can also detect the movement in the shortening direction thereof. Furthermore, since, at a time of putting on the biometric sensor 1, it is not necessary to apply the pretension, the biometric 1 sensor can be put on easily.

Other Embodiments

The embodiments described above do not restrict the constituent features of the present disclosure. Therefore, constituent elements of each part of the above-described embodiment may be omitted, replaced, or added based on the description in the present specification and common technical knowledge, and such omission, replacement, and addition should be construed as falling within the scope of the present disclosure.

In the above-described embodiment, the case in which the fixed member has two reinforcing parts is described; however, there may be one, or three or more reinforcing part(s). Furthermore, the reinforcing part(s) is/are not a necessary component. In a case in which the movement of the measurement target can be grasped by the frame alone, the reinforcing part(s) may be omitted.

In the above-described embodiment, the case in which the biometric sensor has two holding parts is described; however, there may be one, or three or more holding part(s). Furthermore, the holding part(s) is/are not a necessary constituent feature, and may be omitted. In the case of the biometric sensor not having the holding part(s), the substrate may also be omitted. Even in the case of the configuration not involving the holding part(s) or the substrate, the biometric sensor of the present disclosure achieves similar effects.

Figure 7:
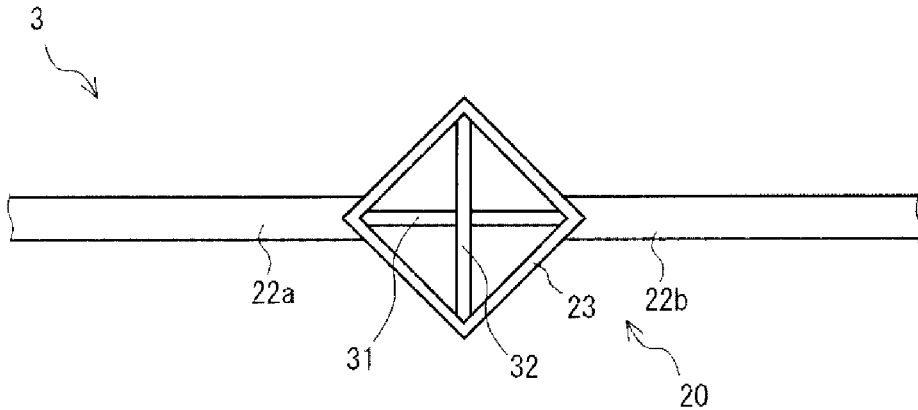
FIG. 7 is a partially enlarged schematic plan view illustrating a frame area of a biometric sensor according to an embodiment which differs from those of FIG. 1 and FIG. 3.

In the above-described embodiment, the case in which the frame is circular ring-shaped is described, but as long as the frame is configured to be deformable at least in the lengthwise direction of the first strain sensor element and the lengthwise direction of the second strain sensor element, another shape may be adopted. Such a shape of the frame may be exemplified by a polygonal ring shape. In a biometric sensor 3 illustrated in FIG. 7, a case of the frame 23 having a diamond-shaped ring, being polygonal ring-shaped, is illustrated.

In the case of the frame 23 thus being polygonal ring-shaped, a configuration in which the lengthwise direction of the first strain sensor element 31 and the lengthwise direction of the second strain sensor element 32 are diagonals, in part, of the frame 23 is preferred. In the case of the frame 23 having the diamond shape, the lengthwise direction of the first strain sensor element 31 and the lengthwise direction of the second strain sensor element 32 form two diagonals of the diamond shape. When such a configuration is carried out, a deformation also occurs in the lengthwise direction of the second strain sensor element 32 due to the elongation and/or shortening in the lengthwise direction of the first strain sensor element 31.

Furthermore, when the frame 23 has the diamond shape, the first strain sensor element 31 and the second strain sensor element 32 cross each other orthogonally, and the crossing position corresponds to the central position of the frame 23. Making such a configuration enables an increase in the measurement accuracy and the measurement sensitivity of the biometric sensor 3.

INDUSTRIAL APPLICABILITY

As described above, the biometric sensor according to the present disclosure is noninvasive, superior in terms of wearing sensation, and can be put on easily, and enables detecting the movement of a measurement target even in the shortening direction.

What is claimed is:

1. A sensor, comprising:
   a fixed member comprising a frame; and
   a first strain sensor element and a second strain sensor element,
   wherein the first strain sensor element and the second strain sensor element extend across the frame and are disposed such that the first strain sensor element and the second strain sensor element cross each other at a crossing position without being joined to each other at the crossing position.

2. The sensor according to claim 1, wherein the first strain sensor element and the second strain sensor element cross each other by extension lines of the lengthwise directions of the first strain sensor element and the second strain sensor element crossing each other.

3. The sensor according to claim 1, wherein the frame is ring-shaped.

4. The sensor according to claim 1, wherein the frame is ring-shaped.

5. The sensor according to claim 4, wherein the frame is configured to be deformable at least in a lengthwise direction of the first strain sensor element and a lengthwise direction of the second strain sensor element.

6. The sensor according to claim 5, wherein each of the first strain sensor element and the second strain sensor element is string-shaped or strip-shaped, and the first strain sensor element and the second strain sensor element are stretchable and recoverable in the lengthwise direction of the first strain sensor element and the lengthwise direction of the second strain sensor element, respectively.

7. The sensor according to claim 6, which is a biometric sensor.

8. The biometric sensor according to claim 7, wherein the first strain sensor element and the second strain sensor element cross each other orthogonally.

9. The biometric sensor according to claim 7, wherein a crossing position where the first strain sensor element and the second strain sensor element cross each other corresponds to a central position of the frame.

10. The biometric sensor according to claim 7, wherein the frame is circular ring-shaped or polygonal ring-shaped.

11. A sensor, comprising:
a fixed member comprising a frame; and
a first strain sensor element and a second strain sensor element,
wherein the first strain sensor element and the second strain sensor element extend across the frame and are disposed such that the first strain sensor element and the second strain sensor element cross each other, and
wherein the fixed member comprises a first reinforcing part and a second reinforcing part, each of the first reinforcing part and the second reinforcing part being rod-shaped or plate-shaped, and the first reinforcing part and the second reinforcing part extending in mutually opposite directions outwards from outer edges of the frame and along a lengthwise direction of the first strain sensor element.

12. The biometric sensor according to claim 7, further comprising:
a substrate being strip-shaped, which is flexible and secures the fixed member; and
a first holding part and a second holding part, each of the first holding part and the second holding part being rod-shaped or plate-shaped, and the first holding part and the second holding part extending, on a top face of the substrate, in the lengthwise direction of the first strain sensor element,
wherein the first holding part and the second holding part are disposed along the lengthwise direction of the first strain sensor element and on outer sides of the frame such that the frame is disposed between the first holding part and the second holding part.

13. A sensor, comprising:
a fixed member comprising a frame;
a first strain sensor element and a second strain sensor element; and
a first flexible substrate configured to be detachably attached to a measurement target,
wherein the first strain sensor element and the second strain sensor element extend across the frame and are disposed such that the first strain sensor element and the second strain sensor element cross each other,
wherein the frame is disposed on the first flexible substrate, and is configured to deform in response to a movement of the measurement target,
wherein in a first case where the measurement target moves in a first direction, the first strain sensor element elongates in a lengthwise direction of the first strain sensor element, the second strain sensor element shortens in a lengthwise direction of the second strain sensor element, and the movement of the measurement target in the first direction is detectable based on the elongation of the first strain sensor element in the lengthwise direction of the first strain sensor element, and
wherein in a second case where the measurement target moves in a second direction different from the first direction, the first strain sensor element shortens in the lengthwise direction of the first strain sensor element, the second strain sensor element elongates in the lengthwise direction of the second strain sensor element, and the movement of the measurement target in the second direction is detectable based on the elongation of the second strain sensor element in the lengthwise direction of the second strain sensor element.

14. The sensor according to claim 13, further comprising a second flexible substrate disposed on the first flexible substrate,
wherein the frame is sandwiched between the first flexible substrate and the second flexible substrate.

15. The sensor according to claim 13, further comprising:
a first reinforcing part disposed on the first flexible substrate, connected to the frame, and extending in a third direction away from the frame; and
a second reinforcing part disposed on the first flexible substrate, connected to the frame, and extending in a fourth direction, opposite to the third direction, away from the frame,
wherein the first reinforcing part and the second reinforcing part align with the first strain sensor element in a straight line.

16. The sensor according to claim 13,
wherein in the first case, the movement of the measurement target in the third direction is detectable based on a change in resistance of the first strain sensor element caused by the elongation of the first strain sensor element in the lengthwise direction of the first strain sensor element, and
wherein in the second case, the movement of the measurement target in the second direction is detectable based on a change in resistance of the second strain sensor element caused by the elongation of the second strain sensor element in the lengthwise direction of the second strain sensor element.

17. The sensor according to claim 1, further comprising a substrate that secures the fixed member and includes a hole that overlaps with the frame of the fixed member in a planar view.

18. The sensor according to claim 4, wherein the frame is ring-shaped.

* * * * *